July 2, 1929.  F. G. HENGST  1,719,054
MECHANISM FOR ELEVATING AND TURNING CULTIVATORS,
HAY RAKES, OR THE LIKE
Filed Aug. 10, 1927   2 Sheets-Sheet 1
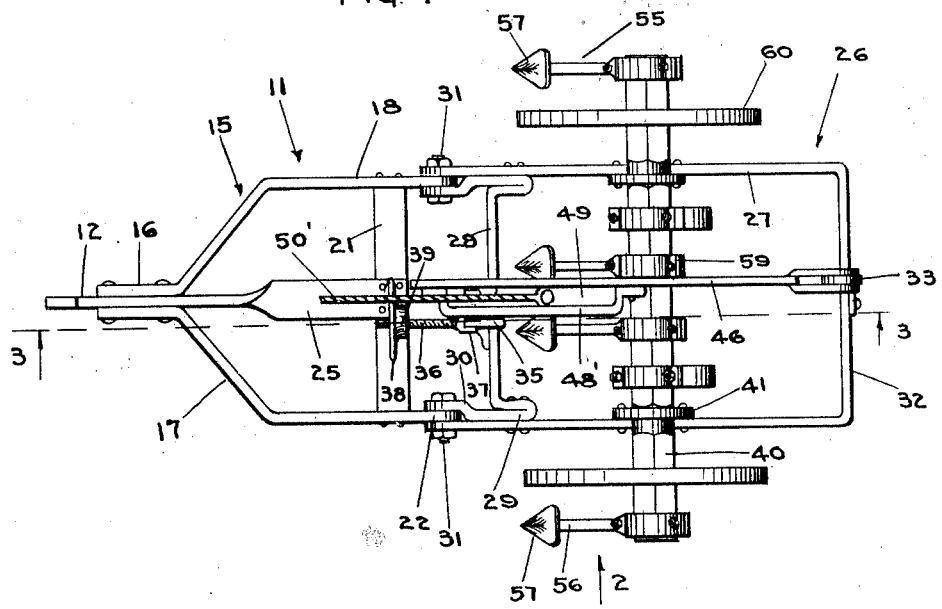
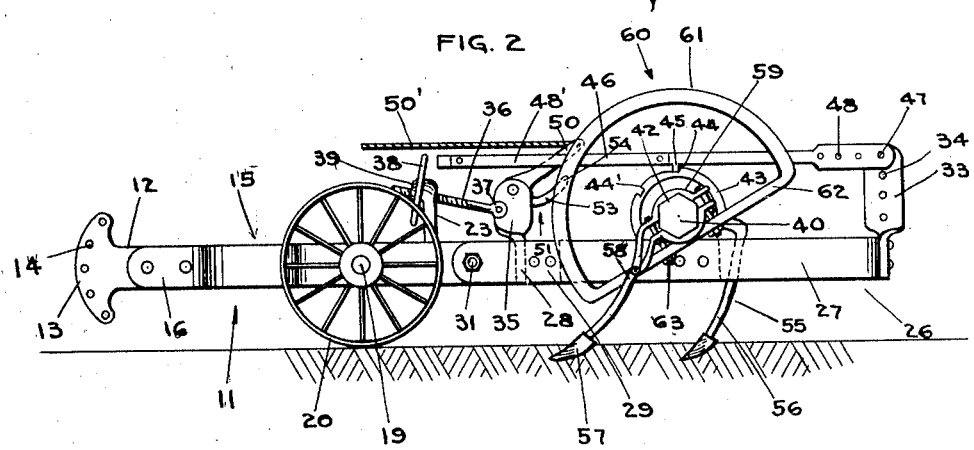
INVENTOR
F. G. HENGST
BY *Hazard and Miller*
ATTORNEYS

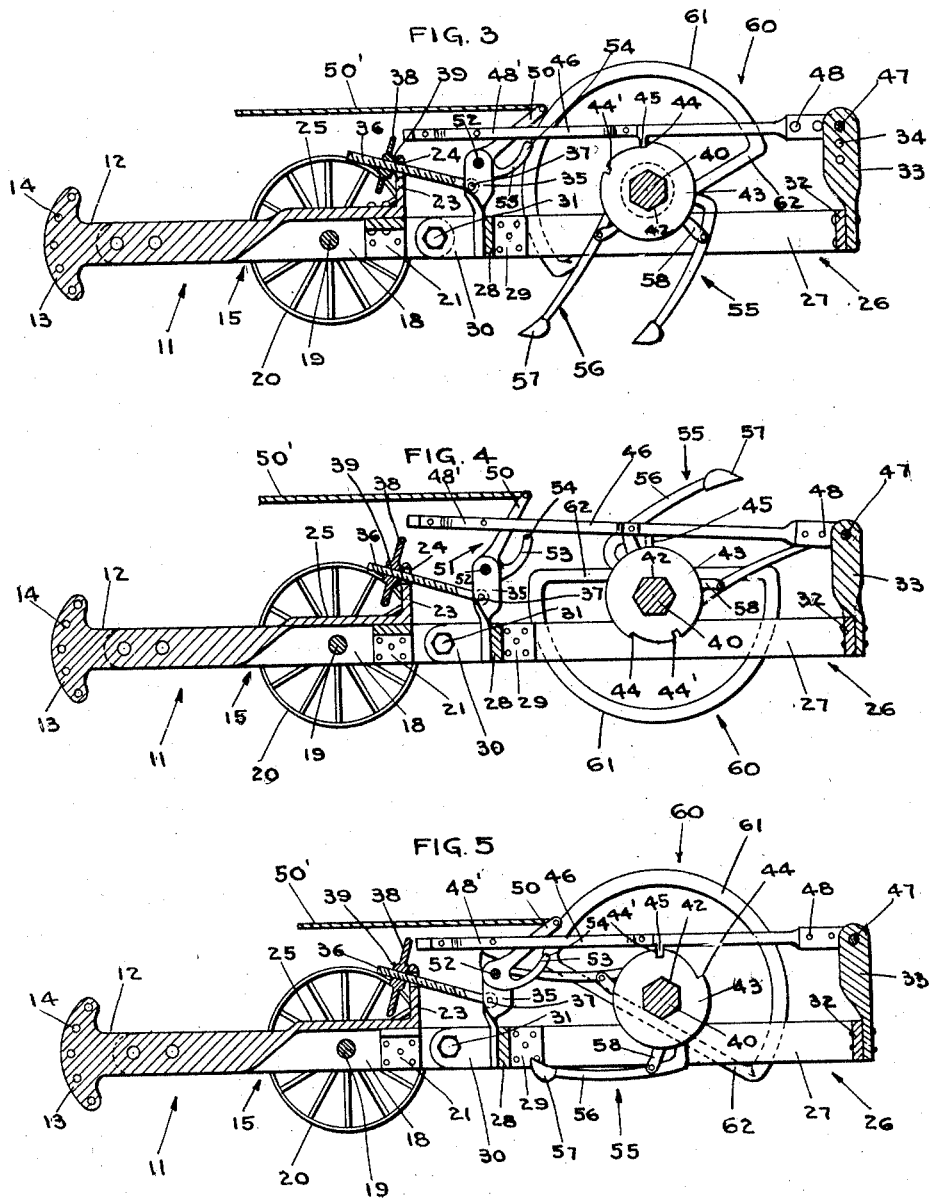
July 2, 1929. F. G. HENGST 1,719,054
MECHANISM FOR ELEVATING AND TURNING CULTIVATORS, HAY RAKES, OR THE LIKE
Filed Aug. 10, 1927  2 Sheets-Sheet 2
INVENTOR
F. G. HENGST
BY Hazard and Miller
ATTORNEYS Patented July 2, 1929.

1,719,054

UNITED STATES PATENT OFFICE.

FREDRICK G. HENGST, OF BLYTHE, CALIFORNIA.

MECHANISM FOR ELEVATING AND TURNING CULTIVATORS, HAYRAKES, OR THE LIKE.

Application filed August 10, 1927. Serial No. 211,939.

My invention is a mechanism for elevating and turning cultivators, hay rakes, or the like.

An object of my invention is a mechanism which may be adapted to elevate and turn cultivators, hay rakes, or other similar farm implements, as well as scrapers, in which the implement engaging the ground or material on the ground requires elevation and a turning over in its cycle of operations.

Another object of my invention is the construction of a mechanism for the above mentioned purpose which may be attached to a tractor or drawn by horses, and in which the particular implement connected thereto is disengaged from the soil or from the material being handled, the implement being then elevated and further carried in a partial rotation on segmental wheels, and then retained in an elevated position to allow movement of the whole mechanism, then to be again shifted by completing the rotary turn of the implement into its operative position.

A more particular object of my invention is the construction of a mechanism having supporting wheels and a frame which may be connected to a tractor with a somewhat rigid connection, forming in effect a rigid frame. Extending rearwardly from the fixed frame, there is a tilted frame on which I have mounted a cross axle or shaft, and on this axle or shaft I may secure different types of implements, such as cultivator teeth, gang plows, or hay rake teeth, or suspend a dirt scraper or the like; also on this cross axle I mount a pair of segmental turning wheels, these being substantially a half circle. Also mounted on the cross axle I have a disk which is engaged by a latch lever. This is arranged with a suitable control device to be actuated from the tractor to retain the implements in their operative position, and by pulling of a cable or the like to release the latch lever and allow turning of the cross axle, this being rotated a part of a circle by engagement of the segmental wheels with the ground. When the operative implements have been raised above the ground to a sufficient extent, the latch lever then engages the disk, or an equivalent construction, and holds these implements in their raised position and with their segmental wheels out of engagement with the ground. The mechanism may then be pulled or pushed by the tractor without the implements performing any function. These may, however, be brought into operation by again pulling on the control cord from the tractor, and releasing the cross axle to allow its further rotation, bringing the particular implement connected to the axle into its operative position.

In the particular mechanism illustrated, I show cultivator teeth connected to the cross axle and these teeth, in their operative position, dig into the soil, and as a further feature of my invention I utilize a mechanism interconnecting the fixed frame and the pivoted frame to adjust the pivoted frame to different heights above the ground surface, so that the cultivator teeth may dig to different depths; or if hay rake teeth are used, these may be adjusted to a proper distance above the ground level. The same adjustment is suitable for other implements which may be connected to the cross axle.

My invention with cultivator teeth connected thereto is illustrated in the accompanying drawings, in which:

Figure 1 is a plan view of my invention taken in the direction of the arrow 1 of Fig. 2.

Figure 2 is a side elevation taken in the direction of the arrow 2 of Fig. 1.

Figure 3 is a vertical longitudinal section on the line 3—3 of Fig. 1 in the direction of the arrows, showing the cultivator teeth, which is an instance of a particular implement in its operative position.

Figure 4 is a similar section to Fig. 3 showing the implement being reversed by the engaging of the segmental wheels with the ground.

Figure 5 is a section similar to Fig. 3 showing the implement completely raised above the ground and the device so locked to permit movement forward or backward, for transportation, turning, or the like.

My invention comprises what may be termed a fixed frame 11 which embodies a tongue 12 having an arcuate forward end 13 with a series of bolt holes 14 therethrough. This is adapted for connection to a tractor in the most convenient place for bolting. Side bars 15 have their forward ends 16 connected to the tongue by rivets or the like, and have diverging sections 17 and parallel sections 18. A carriage axle 19 extends through these side bars and on this axle there are journaled supporting wheels 20.

I also utilize a cross brace 21 between the side bars. These side bars have a rearward extension 22 back of the axle and also back of the cross bar 21. Extending upwardly from the cross bar there is a substantial post 23 which has an opening or slot 24 therein. This post and the cross bar are rigidly connected to a rearward extension 25 of the tongue 12. This makes a solid and substantial carriage with a rigid frame which, when connected to a tractor by being bolted thereto, may be considered as a fixed vehicle or fixed frame.

A movable or tiltable frame 26 has side bars 27 connected by a front brace 28. This front brace is shown as having a reverse bend 29 with rivets therethrough securing the brace to the side bars 27. The bar forming the cross brace has forward extensions 30 spaced apart to accommodate the rearward extensions 22 of the side bars 15 of the fixed frame, and these are connected at opposite sides by pivot pins 31, forming a pivotal connection of the tilting frame to the fixed frame. There is a rear cross bar 32 connecting the rear ends of the side bars 27 and extending upwardly therefrom is a rigid bracket 33 having a series of pivot holes 34 for a purpose hereunder set forth.

Rigidly connected to the front brace 28 there is a strut 35 to which is connected an elevating rod 36 by a pivotal connection 37. This rod is screw threaded and passes through the slot or opening 24 in the post 23. On the forward end of the rod 36 there is a hand wheel 38 having a threaded hub 39, this hub bearing against the post 23. Hence it will be seen that by various adjustments of the hand wheel on the rod 36, the tilting frame can be adjusted in various inclinations in regard to the fixed frame or carriage 11. This allows for cultivating at different depths or controlling of the teeth of hay rakes, or the adjustment of scrapers or other implements connected to the tilting frame, as hereunder set forth.

A heavy cross axle or shaft 40 is mounted on suitable journals 41 on the side frame bars 27 of the tilting frame. This axle is preferably of an irregular shape, such as hexagonal, as indicated at 42, except at the journals, to allow rigid clamping thereto of the different implements. On this axle there is secured a disk 43 which has a shoulder 44 and also a notch 44'. These shoulders and notches are adapted to be engaged by a tooth 45 on a latch lever 46 which is secured by a pivot pin 47 to any one of the pivot holes 34 in the bracket 33. It is also advisable to have a series of holes 48 in the end of the latch lever to give different adjustments.

This lever is provided with a side plate 48' secured thereto, leaving a slot 49 between this plate and the lever, and through this slot there extends a long arm 50 of a bell crank 51, its outer end being connected to a control cable 50'. The lower end of this bell crank being secured to the strut 35 by a pivot pin 52. The short end 53 of the bell crank is bent to one side and has its end 54 engaging underneath the latch lever 46.

Secured to the cross axle or shaft 40 there are implements designated generally by the numeral 55 and in the particular instance shown, these are cultivator arms 56 having plow like points 57. The shank 58 of each of these cultivator arms is secured to the cross axle 40 by clamps 59 which may be of any suitable character to allow adjustable bolting of the particular implements to the cross axle. In the arrangement shown the cultivator arms are staggered so that when in operating position as shown in Figs. 2 and 3, some of the tools will be in front and some behind the cross axle. But it is to be understood that these may be arranged in the most desirable and suitable manner. Rigidly connected to the cross axle 40 are segmental turning wheels 60. Each of these wheels has an arcuate section 61 to be engaged by the ground and a cross connecting strap 62. This latter is secured to the axle by a clamp 63 or other suitable connection. It is to be understood that the arcuate section 61 may have grousers or the like secured thereto.

The manner of operation and functioning of my invention is substantially as follows:

As above described the fixed frame or carriage 11 is secured by bolting to a tractor and hence has its forward end connected in such a manner to prevent tilting of this carriage or frame. However, accommodation is allowed for irregularities in the surface of the ground on which the machine may be used. Also as above described the tilting frame 26 may be adjusted by means of the threaded rod 36 and the hand wheel 38 to the desired inclination or height of the cross axle 40 above the ground.

When the implements 55 are in operative position, that is, in the instance shown, the cultivators are engaging the soil, as shown in Figs. 2 and 3, the tooth 45 on the latch lever 46 engages the shoulder 44 of the disk 43 which is rigidly connected to the cross axle 40. Therefore this cross axle is retained from rotation. The ground may then be cultivated and in this position the segmental wheels 60 are above the ground giving a sufficient clearance. When it is desired to elevate the cultivating tools, the control cable 50' which leads to the tractor is pulled by the driver of the tractor, and this action swings the bell crank 51 so that the end 54 of the short arm 53 lifts up on the latch lever 46. This action disengages the tooth 45 from the shoulder 44 and allows the cultivator implements to rotate the cross axle bringing the segmental wheels 60 into contact with the ground, as shown in Fig. 4.

These wheels then rotate running on the segmental part 61 until the notch 44' in the disk 43 is engaged by the tooth 45, the cable 50, in the meantime, being slack, and this prevents further rotation of the cross shaft 40, holding this shaft, the tools and the segmental wheels in the position shown in Fig. 5. The implement can then be drawn from one place to another for transportation or may be turned or backed up when in this position and sufficient clearance is given above the ground.

When it is desired to again bring the tools into operative relation to the ground, the control cable 50' is again pulled, causing the lifting of the latch lever 46, as above mentioned, which action disengages the tooth 45 from the notch 44' and the weight of the implement rotates the cross axle 40, bringing the implement again into engagement with the ground, and the tooth 45 into engagement with the shoulder 44, thus completing the cycle of operation.

It is manifest that a rotating agricultural implement such as above described has advantages, especially when working with grasses and weeds, such as Bermuda grass which entwines around the cultivator arms, as in the lifting and turning movement this accumulation of material is loosened and dropped. The same applies to the implement when used as a hay rake and if a scraper is attached to the cross axle 40 it is completely dumped and any material clinging thereto is shaken loose.

It will be apparent that my lifting and turning mechanism may be used for a number of different types of agricultural and other implements and it is within the spirit of my invention to adapt other implements for use with the cross axle as above described and the above turning mechanism, and it is not necessary for me to designate other implements which may be connected to the device of my invention, or to illustrate the attachment of these implements to the cross axle 40.

It will be apparent that when my elevating and turning mechanism is used with a cultivator that in reversing the position of the cultivator tools, any materials, such as Bermuda grass or weeds, will be dumped from such arms and not carried and distributed over the field being cultivated. Another advantage of my turning and elevating mechanism arises when it is necessary to back the machine, as frequently happens especially when cultivating orchards, by the cultivating tools gripping the roots of trees or the like. In this case the backing operation in withdrawing the cultivating tools out of the ground may rotate the cross axle 40 in a reverse direction to that of the forward movement, and bring the wheel-like segment into engagement with the ground. These then roll in a reverse or backward direction until the cultivator tools are completely raised above the ground and the device latched in a position with the tooth 45 engaging in the notch 44. On the forward movement the device may again be brought into the operative position.

Various changes may be made in the principles of my invention without departing from the spirit thereof, as set forth in the description, drawings and claims.

I claim:

1. In the art described, the combination of a relatively fixed frame, a tiltable frame pivotally mounted thereon, means interengaging the fixed and the tiltable frame to allow positioning of the tiltable frame in any desired position, a cross shaft on the tiltable frame having implements secured thereto, segmental wheels on the shaft each having an arcuate section to engage the ground, a latching mechanism operatively connected to the cross shaft to hold same with the implements in the operative position for cultivating, or with the implements and the segmental wheels above the ground, the shaft being rotated by the arcuate section of the wheels rolling on the ground.

2. In the art described, the combination of a vehicle frame having wheels with means for attachment to a tractor, a tiltable frame connected thereto, a cross shaft on said frame, implement secured to the cross shaft and means to retain the cross shaft in a plurality of different positions to position the implements for cultivating or above the ground, and means to engage the ground to rotate the cross shaft whereby said implements may be raised above the ground.

3. In the art described, the combination of a relatively fixed frame, a tiltable frame pivotally connected thereto, means interengaging the fixed and the tiltable frame to secure the latter in any desired position, a cross shaft on the tiltable frame having implements secured thereto, segmental wheels on said shaft each having an arcuate section to engage the ground, a latch lever pivotally connected to the tiltable frame, interlatching means between said lever and the shaft to hold the shaft in position with the implements operative for cultivation or with the implements and the segmental wheels raised above the ground, and an operating device to work said lever mounted on the tiltable frame to raise and lower said lever.

4. In the art described, the combination of a relatively fixed frame having wheels with means to attach same at its forward end to a tractor, a tiltable frame pivotally connected to the fixed frame with interengaging means to hold the tiltable frame at any desired position, a cross shaft on the tiltable frame having implements secured thereto and segmental wheels having arcuate sections to engage the ground, a disk on the shaft a latch lever pivotally connected to the tiltable frame, interlatching means between said lever and the disk to hold the shaft with the implements in operative position for cultivation or with the implements and segmental wheels above the ground, the arcuate section of the wheels turning the shaft by engagement with the ground, and an operating lever mounted on the tiltable frame having means to engage the latch lever and a flexible connection from the operating lever adapted for operation from the tractor.

5. In the art described, the combination of a relatively fixed frame having a pair of wheels, said frame having a tongue for attachment to a tractor, a tiltable frame pivotally connected to the fixed frame, a strut extending upwardly from the tiltable frame, a post extending upwardly from the fixed frame, a screw-threaded wheel operatively connected between the strut and the post to adjust the tilting of the tiltable frame, a cross shaft on the tiltable frame having implements and segmental wheels secured thereto, the wheels having arcuate sections to engage the ground, and means to latch the cross shaft in a plurality of positions with the implements in operative position for cultivation and positioned above the ground, said cross shaft being rotated by the arcuate section of the wheels.

6. In the art described, as claimed in claim 5, the means to latch the cross shaft comprising a disk on said shaft having notches, a latch lever pivotally connected to the tiltable frame having means to engage the said notches and hold the disk and the cross shaft in a plurality of positions, an operating lever pivotally mounted on the said strut, a cable connected to one part of the operating lever and said lever having another part positioned to engage the latch lever.

In testimony whereof I have signed my name to this specification.

FREDRICK G. HENGST.